US011481584B2

(12) United States Patent
Ben-Itzhak

(10) Patent No.: US 11,481,584 B2
(45) Date of Patent: Oct. 25, 2022

(54) EFFICIENT MACHINE LEARNING (ML) MODEL FOR CLASSIFICATION

(71) Applicant: VMware, Inc., Palo Alto, CA (US)

(72) Inventor: Yaniv Ben-Itzhak, Afek (IL)

(73) Assignee: VMware, Inc., Palo Alto, CA (US)

( * ) Notice: Subject to any disclaimer, the term of this patent is extended or adjusted under 35 U.S.C. 154(b) by 480 days.

(21) Appl. No.: 16/743,865

(22) Filed: Jan. 15, 2020

(65) Prior Publication Data

US 2021/0216831 A1 Jul. 15, 2021

(51) Int. Cl.
*G06K 9/62* (2022.01)
*G06N 20/20* (2019.01)

(52) U.S. Cl.
CPC ........... *G06K 9/6268* (2013.01); *G06K 9/628* (2013.01); *G06K 9/6259* (2013.01); *G06N 20/20* (2019.01)

(58) Field of Classification Search
CPC .... G06K 9/6268; G06K 9/6259; G06K 9/628; G06N 20/20
See application file for complete search history.

(56) References Cited

U.S. PATENT DOCUMENTS

| | | | | |
|---|---|---|---|---|
| 7,555,155 B2 * | 6/2009 | Levenson | ............... | G06V 20/69 600/407 |
| 8,041,733 B2 * | 10/2011 | Rouhani-Kalleh | ......................... | G06F 16/3325 707/763 |
| 9,576,201 B2 * | 2/2017 | Wu | ...................... | G06K 9/6292 |
| 10,162,850 B1 * | 12/2018 | Jain | ......................... | G06N 20/00 |
| 10,354,009 B2 * | 7/2019 | Liang | ..................... | G06F 16/35 |
| 10,402,641 B1 * | 9/2019 | Dang | ................... | G06V 10/764 |
| 10,409,805 B1 * | 9/2019 | Jain | ......................... | G06F 40/30 |
| 10,726,374 B1 * | 7/2020 | Engineer | ................ | G06F 40/30 |
| 11,181,553 B2 * | 11/2021 | Absher | .................. | G01R 13/22 |
| 11,250,311 B2 * | 2/2022 | Johansen | ................. | G06N 5/04 |
| 11,341,354 B1 * | 5/2022 | Ko | ......................... | G06N 20/20 |
| 11,341,626 B2 * | 5/2022 | Wen | ..................... | G06K 9/6268 |

(Continued)

OTHER PUBLICATIONS

NAsadi et al., "Runtime Optimizations for Tree-Based Machine Learning Models", IEEE Transactions on Knowledge and Data Engineering, vol. 26, No. 9, Sep. 2014, pp. 2281-2292.

(Continued)

*Primary Examiner* — Manav Seth

(57) ABSTRACT

Techniques for implementing an efficient machine learning (ML) model for classification are provided. In one set of embodiments, a computer system can receive a query data instance to be classified. The computer system can then generate a first classification result for the query data instance using a first (i.e., primary) ML model, where the first classification result includes a predicted class for the query data instance and a confidence level indicating a likelihood that the predicted class is correct, and compare the confidence level with a classification confidence threshold. If the confidence level is greater than or equal to the classification confidence threshold, the computer system can output the first classification result as a final classification result for the query data instance. However, if the confidence level is less than the classification confidence threshold, the computer system can forward the query data instance to one of a plurality of second (i.e., secondary) ML models for further classification.

21 Claims, 4 Drawing Sheets

(56) References Cited

U.S. PATENT DOCUMENTS

2020/0202256 A1* 6/2020 Chaudhari ............ G06N 20/20
2021/0241175 A1* 8/2021 Harang ................ G06N 20/20

OTHER PUBLICATIONS

James Browne et al., "Forest Packing: Fast, Parallel Decision Forests", Jun. 19, 2018, 9 pages.
Md. Al Mehedi Hasan et al., "Support Vector Machine and Random Forest Modeling for Intrusion Detection System (IDS)", Journal of Intelligent Learning Systems and Applications, Published Online Feb. 2014, (http://www.scirp.org/journal/jilsa), http://dx.doi.org/10.4236/jilsa.2014.61005, pp. 45-52.
Jong Hwan Ko et al., "Edge-Host Partitioning of Deep Neural Networks with Feature Space Encoding for Resource-Constrained Internet-of-Things Platforms", Feb. 11, 2018, 7 pages.
Mahbod Tavallaee et al., "A Detailed Analysis of the KDD CUP 99 Data Set", Jul. 2009, 8 pages.
Shahid Raza et al., "SVELTE: Real-time intrusion detection in the Internet of Things", May 17, 2013, 14 pages.
Kamaldeep Singh et al., "Big Data Analytics framework for Peer-to-Peer Botnet detection using Random Forests", Information Sciences 278 (2014) pp. 488-497.
Surat Teerapittayanon et al., "BranchyNet: Fast Inference via Early Exiting from Deep Neural Networks", Sep. 6, 2017, 7 pages.
Surat Teerapittayanon et al., "Distributed Deep Neural Networks over the Cloud, the Edge and End Devices", 2017 IEEE 37th International Conference on Distributed Computing Systems, pp. 328-339.
Arijit Ukil et al., "IoT Healthcare Analytics: The Importance of Anomaly Detection", 2016 IEEE 30th International Conference on Advanced Information Networking and Applications, pp. 994-997.
Brian Van et al., "Accelerating a random forest classifier: multi-core, GP-GPU, or FPGA?", Apr. 2012, 9 pages.
Jiong Zhang et al., "Network Intrusion Detection using Random Forests", School of Computing .Queen's University, Kingston, Ontario, Canada, PST, 2005—Citeseer, 9 pages.
K. Hsieh, et al., "Gaia: Geo-distributed machine learning approaching LAN speeds,"in 14th USENIX Symposium on Networked Systems Design and Implementation(NSDI 17), pp. 629-647, 2017.
T. Chilimbi, et al., "Project Adam: Building an efficient and scalable deep learning training system," in 11th USENIX Symposium on Operating Systems Design and Implementation (OSDI 14), pp. 571-582, 2014.
Jakub Konecny, et al., "Federated Learning: Strategies for Improving Communication Efficiency," arXiv preprint arXiv:1610.05492, 5 pages, 2016.
H. Daga, et al., "Cartel: A System for Collaborative Transfer Learning at the edge," in Proceedings of the ACM Symposium on Cloud Computing, 21 pages, 2019.
A. Padmanabha Iyer, et al., "Mitigating the Latency-accuracy Trade-off in Mobile Data Analytics Systems," in Proceedings of the 24th Annual International Conference on Mobile Computing and Networking, pp. 513-528, 2018.
Related U.S. Appl. No. 17/021,454, filed Jun. 22, 2020 (unpublished); Copy available via USPTO Private Pair website; (Attorney Docket No. G660).
Related U.S. Appl. No. 16/908,498, filed Sep. 15, 2020 (unpublished).

* cited by examiner

EFFICIENT MACHINE LEARNING (ML) MODEL FOR CLASSIFICATION

BACKGROUND

In machine learning (ML), classification is the task of predicting, from among a set of predefined classes, the class to which a given data point or observation (i.e., "data instance") belongs using a trained mathematical model (i.e., "ML model"). Anomaly detection is a particular use case of classification that involves predicting whether a data instance belongs to a "normal" class or an "anomaly" class, under the assumption that most data instances are in fact normal rather than anomalous. Example applications of anomaly detection include identifying fraudulent financial transactions, detecting faults in safety-critical systems, facilitating medical diagnoses, and detecting intrusions/attacks in computer networks.

With the proliferation of IoT (Internet of Things) and edge computing, it is becoming increasingly useful/desirable to offload certain computing tasks, including ML-based classification/anomaly detection, from centralized servers to edge devices such as IoT-enabled sensors and actuators, home automation devices and appliances, mobile devices, IoT gateways, and so on. However, traditional ML models for classification/anomaly detection generally rely on monolithic classifiers that exhibit a large memory footprint, relatively long training time (and thus high power consumption), and relatively high classification latency. As a result, these traditional ML models cannot be implemented as-is on edge devices, which are often constrained in terms of their memory, compute, and/or power resources.

DETAILED DESCRIPTION

Figure 1:
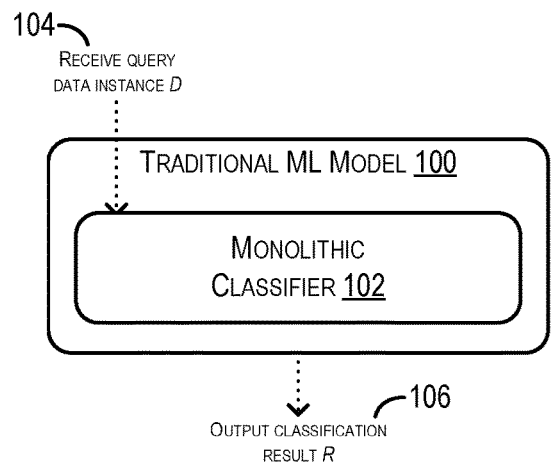
FIG. 1 depicts a traditional ML model comprising a monolithic classifier.

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Embodiments of the present disclosure are directed to a lightweight and efficient ML model for classification (and more specifically, anomaly detection). Generally speaking, this ML model—referred to herein as the "REC" (resource-efficient classification) model—is composed of two model layers: a first layer comprising a "primary" ML model and a second layer comprising a number of "secondary" ML models.

When a query (i.e., unknown/unlabeled) data instance is received for classification, the REC model can initially pass the data instance to the primary ML model, which is designed to be small in memory size and capable of handling the classification of "easy" data instances (i.e., those that can be classified with a high degree of confidence). Upon receiving the data instance, the primary ML model can generate a classification result that includes (1) a predicted classification for the data instance and (2) an associated confidence level indicating the empirical probability/likelihood that the predicted classification is correct. If this confidence level matches or exceeds a predefined confidence threshold (referred to herein as the classification confidence threshold, or $th_c$), the REC model can output the primary ML model's classification result as the final classification result for the data instance and terminate its processing.

However, if the confidence level generated by the primary ML model is below $th_c$ (indicating that the primary model is uncertain about its predicted classification), the REC model can forward the data instance to one of the secondary ML models. In various embodiments, each of these secondary ML models can be explicitly trained to classify "hard" data instances that the primary ML model is unsure about (or in other words, is unable to classify with a sufficiently high confidence level). For example, if there are two possible classes C1 and C2, a first secondary ML model may be trained to classify data instances which the primary ML model thinks (but is not certain) belongs to C1, and a second secondary ML model may be trained to classify data instances which the primary ML model thinks (but is not certain) belongs to C2. In response to receiving the forwarded data instance, the appropriate secondary ML model can generate a classification result for the data instance based on its training and the REC model can output the secondary ML model's classification result as the final classification result for the data instance.

With the general design and approach above, the REC model can achieve a level of classification accuracy that is similar to traditional ML models which are based on monolithic classifiers, but with significantly improved training time, classification latency, and memory consumption. Thus, the REC model advantageously enables ML-based classification to be performed on computing devices that have limited compute, memory, and/or power resources, such as edge devices in an IoT deployment. The foregoing and other aspects of the present disclosure are described in further detail in the sections that follow.

It should be noted that several of the embodiments and examples presented below discuss the REC model in the specific context of anomaly detection, which as mentioned previously involves the classification of data instances into one of two classes, normal and anomaly. This focus on anomaly detection simplifies the discussion because there are only two classes to consider, and also highlights the benefits of the REC model because the uneven distribution of data instances across the normal and anomaly classes generally results in even faster training and lower average classification latency than other classification use cases. However, the REC model is not solely limited to anomaly detection and may be broadly applied to any type of classification task comprising any number of classes, with any kind of data distribution across those classes.

2. Model Architecture

To provide context for the REC model described herein, FIG. 1 depicts a traditional ML model 100 for anomaly detection comprising a monolithic classifier 102 and a classification workflow that may be executed by the model.

Classifier 102 is "monolithic" in the sense that it represents a singular and typically large/complex instance of a particular ML classification algorithm, such as a random forest (RF) classifier, an artificial neural network (ANN), a naive Bayes classifier, etc.

During an initial training phase (not shown), traditional ML model 100 can receive training data instances from a training data set, where each training data instance is labeled as belonging to the normal class or the anomaly class. Based on this training data set, traditional ML model 100 can adjust various internal parameters of monolithic classifier 102 in a manner that enables model 100 to learn the correct (i.e., labeled) class for each training data instance, as well as other data instances that are similar to the training data instances.

Then during a classification, or "query," phase (shown in FIG. 1), traditional ML model 100 can receive a query data instance D (reference numeral 104) and generate, via monolithic classifier 102, a classification result R indicating the model's predicted classification for data instance D (i.e., normal or anomaly), as well as a confidence level for the predicted classification (reference numeral 106). The exact format of this classification result can vary depending on the type of monolithic classifier 102. For example, in the scenario where classifier 102 is an RF classifier, the classification result can take the form of a class distribution vector which includes, for each of the normal and anomaly classes, a confidence level value indicating the probability/likelihood that data instance D belongs to that class (e.g., [normal=0.78, anomaly=0.22]). In this scenario, the predicted classification generated by model 100 can correspond to the class with the highest associated confidence level within the vector. Generally speaking, the sum of the various per-class confidence levels will equal 1; thus, in the anomaly detection use case where there are exactly two classes, the possible range of confidence level values for the predicted classification (i.e., the class with the highest confidence value) will be 0.5 to 1.

As noted in the Background section, one issue with employing a traditional ML model like model 100 of FIG. 1 for classification/anomaly detection is that, due to the monolithic nature of its classifier 102, model 100 is not particularly efficient in terms of memory footprint, power consumption, training time, and classification latency. While this is acceptable if traditional ML model 100 is run on a computing device/system with significant compute/memory/power resources (e.g., a dedicated server), these limitations mean that model 100 cannot be easily implemented on less capable devices/systems, such as edge devices (e.g., mobile devices, sensors, actuators, appliances, etc.) in an IoT or edge computing deployment.

Figure 2:
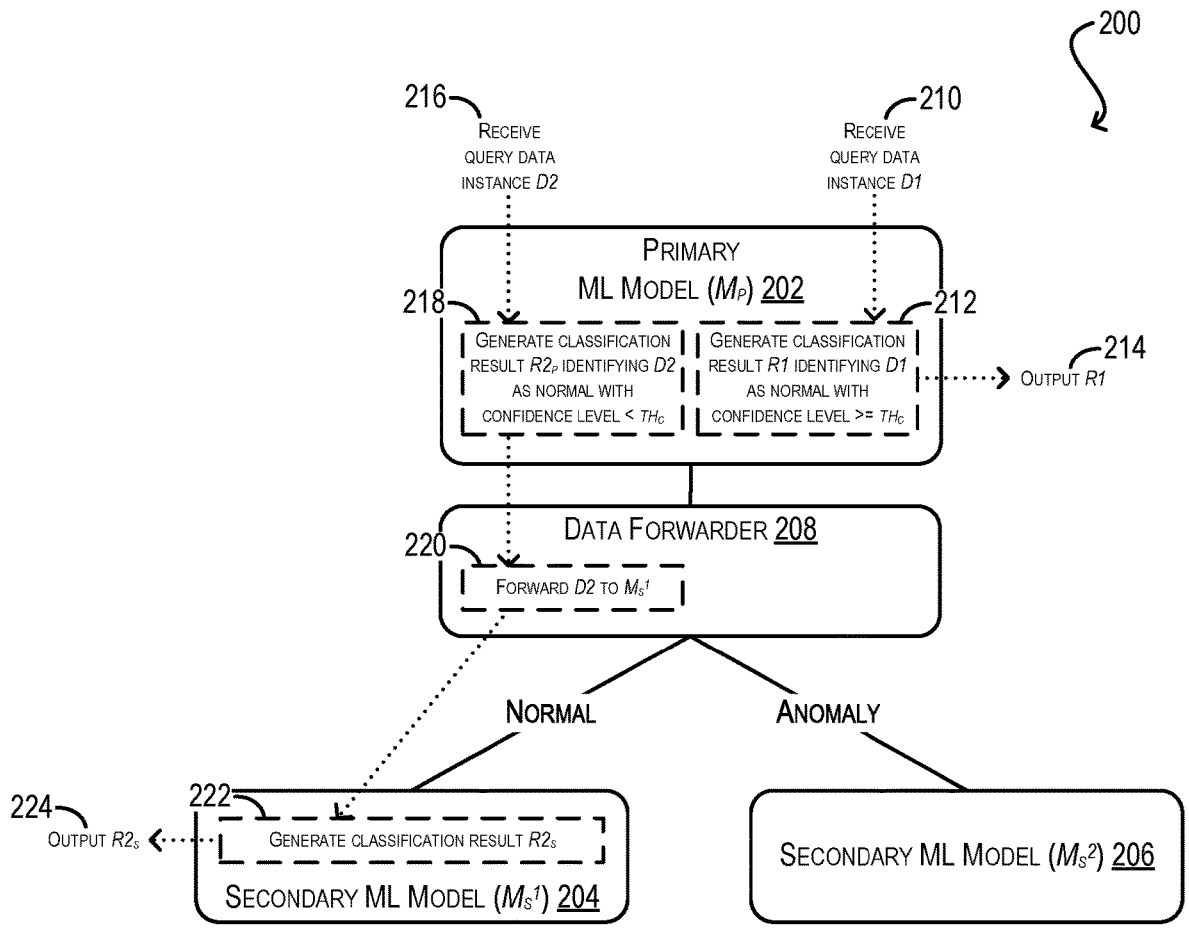
FIG. 2 depicts the architecture of a lightweight and efficient ML model for classification/anomaly detection (i.e., REC model) according to certain embodiments.

To address the foregoing and other similar issues, FIG. 2 depicts the architecture of a novel ML model 200 (referred to herein as the REC, or "resource-efficient classification" model) that may be used for anomaly detection according to certain embodiments. As shown, REC model 200 is composed of two model layers: a first layer comprising a primary ML model ($M_p$) 202 and a second layer comprising two secondary ML models ($M_s^1$ and $M_s^2$) 204 and 206 (one for the normal and anomaly classes respectively). In addition, REC model 200 includes a data forwarder 208 sitting between primary ML model 202 and secondary ML models 204/206.

At a high level, primary ML model 202 can be implemented using a small/simple ML classifier (e.g., an RF classifier with only a few trees and low maximum depth) and can handle the classification of easy data instances that clearly belong to one class or the other. In the context of anomaly detection, this will correspond to the majority of classification queries because most data instances will be obviously normal. For example, as shown via reference numerals 210-214 in FIG. 2, REC model 200 can receive a query data instance D1 and pass it to primary ML model 202. Primary ML model 202 can generate a classification result R1 for D1 that identifies D1 as being normal with a confidence level matching or exceeding a predefined classification confidence threshold $th_c$, indicating that primary model 202 is highly confident in this predicted classification. In response, REC model 200 can directly output R1 as the final classification result for D1 and terminate its processing.

In contrast to primary ML model 202, secondary ML models 204 and 206 can be implemented using larger/more complex ML classifiers (e.g., RF classifiers with more trees and greater maximum depth) and can be explicitly trained to be "experts" in classifying hard data instances that primary ML model 202 is unsure about (i.e., data instances which model 202 has classified with low confidence). Thus, for such hard data instances, rather than accepting the low-confidence classifications generated by primary ML model 202, REC model 200 can forward the data instances to an appropriate secondary ML model 204/206 for further classification.

For example, as shown via reference numerals 216-224 of FIG. 2, in the scenario where REC model 200 receives a query data instance D2 that primary ML model 202 classifies as normal with low confidence (i.e., generates a classification result $R2_p$ indicating that D2 is normal with a confidence level below $th_c$), data forwarder 208 can forward D2 from primary ML model 202 to secondary ML model 204 (which is trained to handle low-confidence "normal" classifications). Secondary ML model 204 can then generate its own classification result $R2_s$ for data instance D2, which REC model 200 can thereafter output as the final classification result for D2.

The specific way in which secondary ML models 204/206 are trained to be experts in classifying the data instances that are difficult for primary ML model 202 is detailed in section (3) below, but generally speaking this training can be driven by the confidence levels generated by primary ML model 202 in a manner similar to how classification is carried out as explained above. For instance, at the time of receiving a training data set, the entire training data set can first be used to train primary ML model 202. Then, for each training data instance in the training data set, the training data instance can be classified by the trained version of primary ML model 202 and a classification result can be generated. If the classification result includes a confidence level that is greater than or equal to a predefined training confidence threshold $th_t$, that means primary ML model 202 can adequately handle the classification of that data instance (and other similar data instances) and no further training with respect to the data instance is needed.

However, if the classification result generated by primary ML model 202 includes a confidence level that is less than $th_t$, that means this is a hard data instance for model 202 to classify. Thus, the training data instance can be forwarded to the appropriate secondary ML model 204/206 that is intended to be an expert for hard data instances of the class identified by primary ML model, and that secondary ML model can be trained using the training data instance.

More particularly, secondary ML model 204 ($M_s^1$), which is designated to be an expert in classifying data instances which primary ML model 202 ($M_p$) has identified as normal but is unsure about, will be trained on all such "normal" training data instances (as determined by $M_p$) whose corresponding $M_p$ confidence levels fall between 0.5 and $th_t$. Similarly, secondary ML model 204 ($M_s^2$), which is designated to be an expert in classifying data instances which primary ML model 202 ($M_p$) has identified as anomalous but is unsure about, will be trained on all such "anomaly" training data instances (as determined by $M_p$) whose corresponding $M_p$ confidence levels fall between 0.5 and $th_t$. Thus, secondary ML models 204 and 206 will only be trained on specific fractions of the overall training data set that correspond to the hard data instances for primary ML model 202.

With regards to classification, secondary ML model 204 ($M_s^1$) will only classify unknown data instances that are determined to be normal by primary ML model 202 and whose corresponding $M_p$ confidence levels fall between 0.5 and $th_c$, and secondary ML model 206 ($M_s^2$) will only classify unknown data instances that are determined to anomalous by primary ML model 202 and whose corresponding $M_p$ confidence levels fall between 0.5 and $th_c$. All other "easy" data instances will be directly handled by primary ML model 202 (which will typically account for the majority of classification queries in the anomaly detection use case).

It should be noted that $th_c$ (which is used to drive classification) can be equal or less than $th_t$ (which is used to drive training). One reason for setting $th_c$ to be less than $th_t$ is to ensure that each secondary ML model 204/206 is trained with a larger range of training data instances (in terms of primary confidence level) than the range of query data instances that will be forwarded to that secondary model at the time of classification. This advantageously allows each secondary ML model 204/206 to be more robust and less sensitive to possible small variances in confidence level values generated by primary ML model 202. In other embodiments, $th_c$ can be set to be exactly equal to the $th_t$.

With the model architecture presented in FIG. 2 and the foregoing description, a number of benefits are achieved. First, because primary ML model 202 is based on a small ML classifier and secondary ML models 204 and 206 are trained on relatively small subsets of the overall training data set, the training time and memory footprint required by REC model 200 will generally be less than the training time and memory footprint required by traditional ML models that rely on monolithic classifiers like model 100 of FIG. 1. This enables REC model 200 to consume less power and memory during its runtime operation, which in turn allows the model to be implemented on battery-powered and/or memory-constrained devices/systems such as mobile devices, appliances, embedded systems, etc.

Second, because small primary ML model 202 can successfully classify the majority of query data instances (i.e., classification queries) in the anomaly detection use case, with only a small fraction of classification queries being forwarded to secondary ML models 204 and 206, the classification latency exhibited by REC model 200—or in other words, the amount of time needed for the model to generate a final classification result—will generally be substantially lower than that of traditional ML models. This facilitates the implementation of REC model 200 on compute-constrained device/systems, and also opens the door for new anomaly detection applications that require extremely low latency times.

The remaining sections of the present disclosure provide additional details regarding the training and classification workflows for REC model 200, as well as various model enhancements and extensions. It should be appreciated that the model architecture shown in FIG. 2 is illustrative and not intended to be limiting. For example, although REC model 200 is depicted as comprising exactly two secondary ML models 204 and 206 corresponding to the normal and anomaly classes in the anomaly detection use case, as mentioned previously the REC model is not limited to anomaly detection and can be applied to more general classification tasks (i.e., the classification of data instances across k classes with any data distribution across the classes). In these alternative embodiments, the number of secondary ML models incorporated into REC model 200 may be equal to k, less than k, or greater than k, depending on the specific confidence level-driven criteria that are used to partition training and query data instances across those models.

Further, although REC model 200 is generally assumed to be a singular entity that is run on a single computing device/system, in some embodiments the sub-models of REC model 200 (i.e., primary ML model 202 and secondary ML models 204 and 206) may be distributed across multiple computing devices/systems for enhanced performance, reliability, fault tolerance, or other reasons. For example, in a particular embodiment, primary ML model 202 may be deployed on an edge device in an IoT deployment while secondary ML models 204 and 206 may be deployed on one or more servers in the cloud. One of ordinary skill in the art will recognize other variations, modifications, and alternatives.

3. Training Workflow

Figure 3:
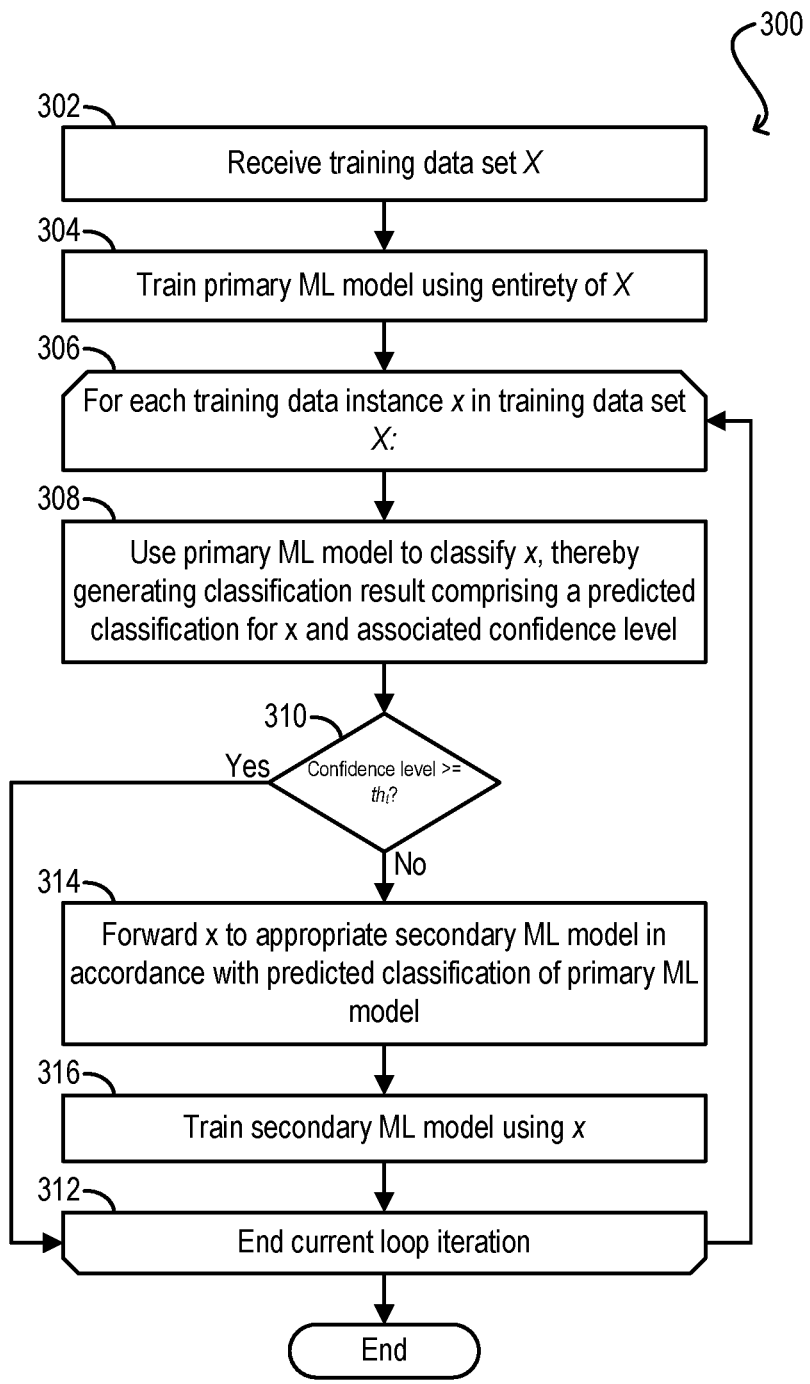
FIG. 3 depicts a training workflow that may be carried out by the REC model of FIG. 2 according to certain embodiments.

FIG. 3 depicts a workflow 300 for training REC model 200 of FIG. 2 according to certain embodiments. Starting with blocks 302 and 304, a training data set X comprising labeled training data instances can be received and primary ML model 202 can be trained using the entirety of X.

Once primary ML model 202 has been trained, a loop can be entered for each training data instance x in training data set X (block 306). Within this loop, primary ML model 202 can classify training data instance x and thus generate a classification result for x comprising a predicted classification (i.e., normal or anomaly) and an associated confidence level (block 308). This confidence level can then be evaluated against predefined training confidence threshold $th_t$ (block 310).

If the confidence level is greater than or equal to $th_t$, the end of the current loop iteration can be reached (block 312) and workflow 300 can return to the top of the loop (block 306) in order to process the next training data instance in training data set X.

However, if the confidence level is less than $th_t$, data forwarder 208 can forward x to an appropriate secondary ML model 204/206 in accordance with its primary classification generated at block 308 (block 314). For example, if primary ML model 202 determined at block 308 that x is normal, data forwarder 208 will forward x to secondary ML model 204 (which is designated to be an expert in classifying such low-confidence "normal" data instances). Conversely, if primary ML model 202 determined at block 308 that x is anomalous, data forwarder 208 will forward x to secondary ML model 206 (which is designated to be an expert in classifying such low-confidence "anomaly" data instances).

It should be noted that data forwarder 208 does not forward training data instance x at block 314 in accordance with the training data instance's true (i.e., labeled) class. This is because the goal in training secondary ML models 204 and 206 is to have them succeed in the cases where primary ML model 202 may fail. Thus, the training data instances forwarded to a given secondary ML model 204/206 should include both (1) low-confidence data instances that truly belong to their corresponding labeled class, and (2) low-confidence data instances that do not belong to their labeled class, but primary ML model 202 believes that they do. This ensures that each secondary ML model 204/206 becomes an expert in classifying the data instances that primary ML model 202 may incorrectly classify.

At block 316, the secondary ML model 204/206 that receives training data instance x from data forwarder 208 can be trained using x. Upon training the secondary ML model, the end of the current loop iteration can be reached as before (block 312) and workflow 300 can return to block 306 in order to process the next training data instance in training data set X. Finally once all of the training data instances in training data set X have been processed, workflow 300 can end.

To further clarify the nature of training workflow 300, the following is a pseudo-code representation of workflow 300 according to certain embodiments. In this pseudo-code representation, it is assumed that coarse grained ML model 202 (i.e., $M_p$) employs an RF classifier and thus generates a class distribution vector $d_x$ as its classification result for each training data instance x. The two representations are otherwise largely similar (with line 1 below corresponding to block 304 of workflow 300 and lines 4-10 below roughly corresponding to blocks 306-316 of workflow 300).

Listing 1
Inputs: Labeled training data set X, training confidence threshold $th_t$ 1:  train $M_p$ using X
2:  for each class y:
3:      set: data[y] = Ø
4:  for each x ∈ X:
5:      obtain primary class distribution vector $d_x = M_p(x)$
6:      if max($d_x$) < $th_t$:
7:          classify: y = argmax($d_x$)
8:          update: data[y].append(x)
9:  for each y ∈ {i | data[i] ≠ Ø}:
10:     train $M_s^y$ using data[y]

It should be appreciated that training workflow 300 of FIG. 3 is illustrative and various modifications are possible. For example, in some scenarios each training data instance x of training data set X will be composed of a plurality of features (such as, e.g., a vector of f values). In these scenarios, primary ML model 202 may be trained using only a selected subset g<f of the features of each training data instance, rather than the entire feature set. Feature subset g may be selected based on various factors/criteria, such as the anomaly detection application to which REC model 200 is being applied, deployment constraints, the relative importance/significance of the features, etc. With this approach, the training time and memory footprint of REC model 200 can be further reduced, at the expense of some classification accuracy. In the case where a training data instance is forwarded to a secondary ML model 204/206 due to a low-confidence classification generated by primary ML model 202, the secondary ML model may utilize feature subset g or alternatively the entire feature set f for its training.

Further, although workflow 300 indicates that data forwarder 208 forwards low-confidence training data instances (i.e., those training data instances that primary ML model 202 cannot classify with certainty per $th_t$) to a single secondary ML model 204/206 for training, in some embodiments data forwarder 208 may specifically forward low-confidence training data instances that are labeled as "anomaly" to both secondary ML models 204 and 206. The intuition behind this modification is that the anomaly class will generally be significantly smaller than the normal class in terms of the number of data instances (and its low-confidence subset will be even smaller), which leads to two problems: (1) less accurate classification of anomalous data instances by primary ML model 202, and (2) increased probability of overfitting by the secondary ML models. By forwarding low-confidence, truly anomalous training data instances to both secondary ML models for training, the likelihood of (1) and (2) occurring can be reduced and each secondary ML model can become a better expert for those classification queries in which primary ML model 202 is more likely to make a classification mistake.

Listing 2 below is a pseudo-code representation of this modified version of training workflow 300 according to certain embodiments:

Listing 2
Inputs: Labeled training data set X, training confidence threshold $th_t$ 1:  train $M_p$ using X
2:  set: data[$s_1$] = Ø
3:  set: data[$s_2$] = Ø
4:  for each x ∈ X:
5:      obtain primary class distribution vector $d_x = M_p(x)$
6:      if max($d_x$) < $th_t$:
7:          if x.label == anomaly:
8:              update: data[$s_1$].append(x)
9:              update: data[$s_2$].append(x)
10:         else:
11:             classify: y = argmax($d_x$)
12:             if y == normal:
13:                 update: data[$s_1$].append(x)
14:             else:
15:                 update: data[$s_2$].append(x)
16: train $M_s^1$ using data[$s_1$]
17: train $M_s^2$ using data[$s_2$]

4. Classification (Query) Workflow

Figure 4:
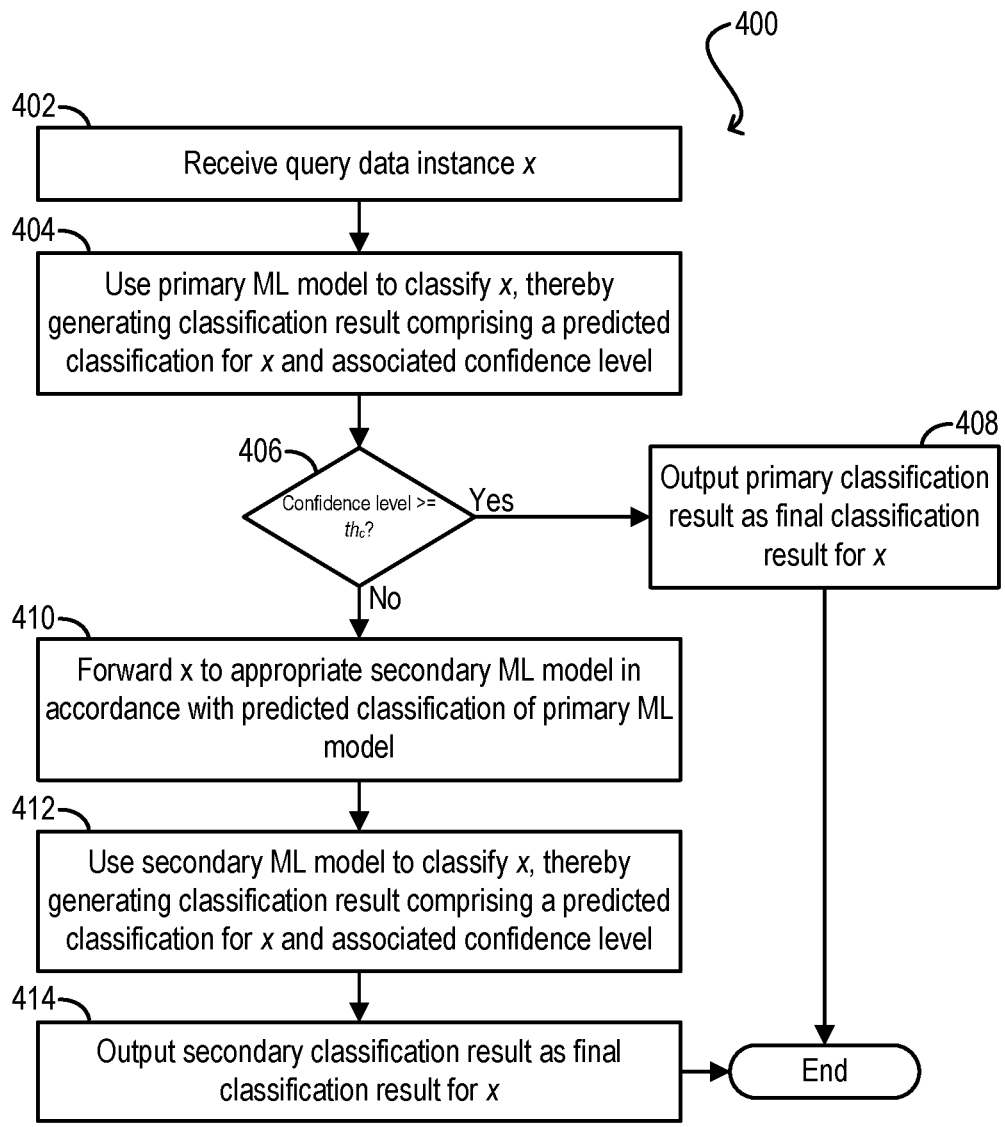
FIG. 4 depicts a classification (i.e., query) workflow that may be carried out by the REC model of FIG. 2 according to certain embodiments.

FIG. 4 depicts a classification (i.e., query) workflow 400 that may be executed by REC model 200 of FIG. 2 according to certain embodiments. Workflow 400 assumes that REC model 200 has been trained via training workflow 300 of FIG. 3.

Starting with blocks 402 and 404, REC model 200 can receive a query (i.e., unknown/unlabeled) data instance x and pass it to primary ML model 202, which can classify it and generate a classification result comprising a predicted classification for x and an associated confidence level.

At block 406, REC model 200 can check whether the confidence level is greater than or equal to classification confidence threshold $th_c$. If so, REC model 200 can return the classification result generated by primary ML model 202 as the final classification result for x (block 408) and workflow 400 can end.

However, if the confidence level is less than $th_c$, REC model 200 can forward x, via data forwarder 208, to an appropriate secondary ML model 204/206 in accordance with the primary classification generated at block 404 (block 410). For example, if primary ML model 202 determined at block 404 that x is normal, data forwarder 208 will forward x to secondary ML model 204 (which has been trained to be an expert in classifying such low-confidence "normal" data instances). Conversely, if primary ML model 202 determined at block 404 that x is anomalous, data forwarder 208 will forward x to secondary ML model 206 (which has been trained to be an expert in classifying such low-confidence "anomaly" data instances).

Finally, at blocks 412 and 414, the secondary ML model that receives query data instance x from data forwarder 208 can generate a classification result for x and REC model 200 can output that secondary classification result as the final classification result for x. Workflow 400 can subsequently end.

To further clarify the nature of classification workflow 400, the following is a pseudo-code representation of workflow 400 according to certain embodiments. Similar to previous pseudo-code listings 1 and 2, it is assumed that coarse grained ML model 202 (i.e., $M_p$) and secondary ML models 204/206 (i.e., $M_s^y$ for y=1, 2) employ RF classifiers and thus each generates a class distribution vector $d_x/d_x'$ as its classification result for query data instance x.

Listing 3
Inputs: Query data instance x, classification confidence threshold $th_c$

```
1:   obtain primary class distribution vector d_x = M_p(x)
2:   classify: y = argmax(d_x)
3:   if max(d_t) ≥ th_c:
4:       return y
5:   else:
6:       obtain primary class distribution vector d_x' = M_s^y (x)
7:       classify: y' = argmax(d_x')
8:       return y'
```

It should be appreciated that classification workflow 400 of FIG. 4 is illustrative and various modifications are possible. For example, as noted with respect to training workflow 300 of FIG. 3, in some embodiments primary ML model 202 may be trained using only a selected subset g<f of the features of each training data instance received by REC model 200. In these embodiments, at the time of receiving a query data instance x for classification (which will have the same feature set f as the training data instances), primary ML model 202 may perform its classification of x by only taking into account feature subset g, rather than x's entire feature set f. This can further reduce the classification latency of REC model 200. In the scenario where query data instance x is forwarded to a secondary ML model 204/206 due to a low-confidence classification generated by primary ML model 202, the secondary ML model may classify x using feature subset g or alternatively the entire feature set f.

Further, in some cases primary ML model 202 may generate a classification result for a query data instance x with a confidence level that is very low (e.g., close to 0.5). This level of confidence indicates that primary ML model 202 is highly unsure of its classification of x, to the point where the classification can be considered arbitrary/random. In these situations, REC model 200 can employ a "quorum-based" approach in which REC model 200 forwards x to both secondary ML models 204 and 206, rather than to a single secondary model, for further classification. Upon receiving the classification results generated by each secondary ML model, REC model 200 can select the secondary classification that has the highest confidence level and output that classification as the final classification result. In this way, REC model 200 can simultaneously leverage both secondary ML models to try and obtain an accurate classification for x, given the degree of uncertainty exhibited by primary ML model 202.

Yet further, in certain embodiments REC model 200 can forward low-confidence classifications generated by secondary ML models 204/206 to an external ML model, such as a large ML model hosted in the cloud. This external ML model may use a monolithic classifier such as classifier 102 depicted in FIG. 1 and/or may employ a different type of classification algorithm/method than those employed by secondary ML models 204/206 or primary ML model 202. For example, if models 202/204/206 are based on RF classifiers, the external ML model may be based on an ANN. Upon receiving the classification result generated by the external ML model, REC model 200 can output that result as the query's final classification result (assuming the external ML model's result has a higher confidence level than the results generated by secondary ML models 204 and 206). Thus, with this enhancement, REC model 200 can achieve high classification accuracy (via the external ML model) in those rare cases where secondary ML models 204 and 206 are unable to produce a high-confidence result.

5. Hierarchical Anomaly Detection

Some data sets that need to be monitored for anomalies may have more than a single "normal" class and a single "anomaly" class. For instance, a data set H may comprise "normal" data instances that can be further categorized into a "normal1" type or "normal2" type, as well as "anomaly" data instances that can be further categorized into an "anomaly1" type or an "anomaly2" type. For this kind of data set, it would be useful to be able to quickly identify an unlabeled data instance as being normal or anomalous (in order to take an appropriate action if it is anomalous), but also be able to drill down and further classify the data instance as being of a particular normal type (e.g., normal1 or normal2) or a particular anomaly type (e.g., anomaly1 or anomaly2) in an accurate and efficient manner.

Figure 5:
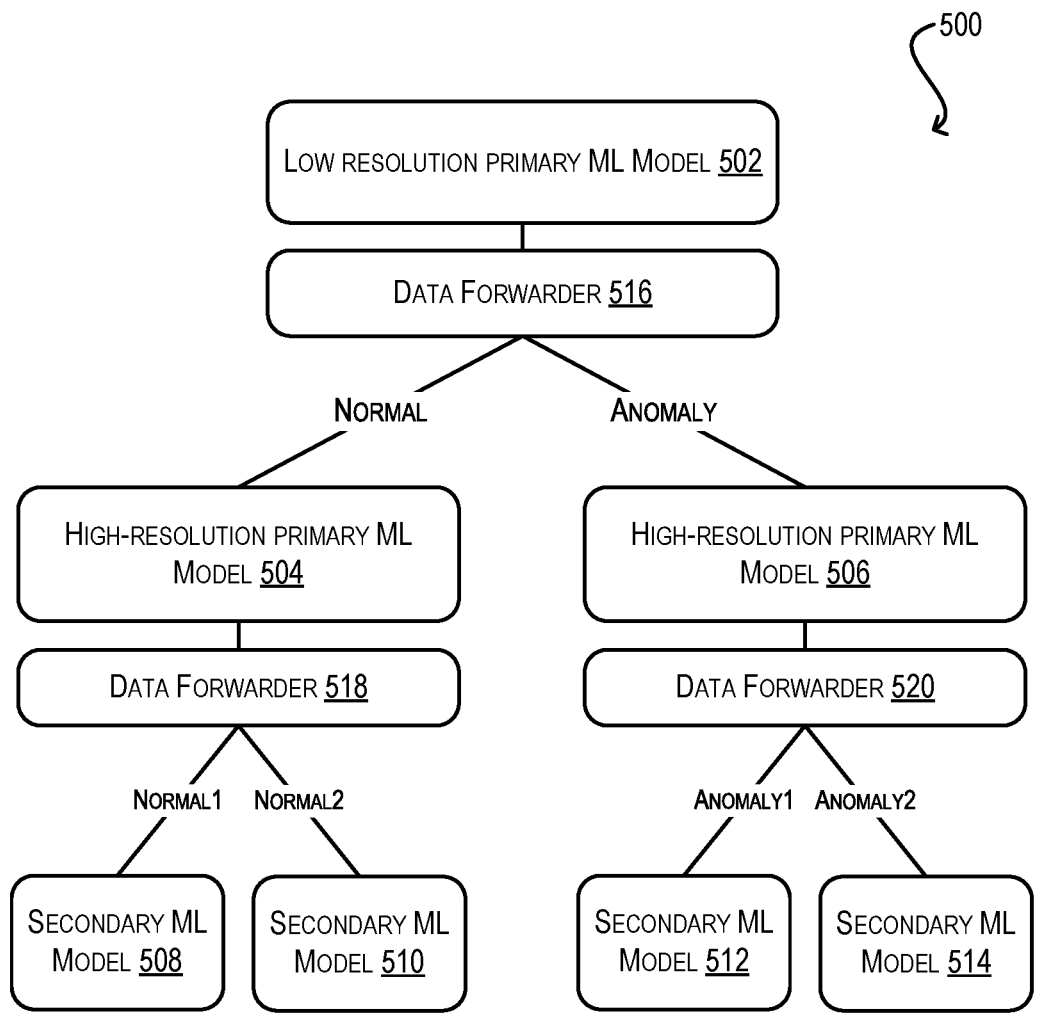
FIG. 5 depicts a hierarchical version of the REC model of FIG. 2 according to certain embodiments.

To address this need, FIG. 5 depicts a hierarchical version of REC model 200 of FIG. 2 (i.e., hierarchical REC model 500) that includes a "low-resolution" primary ML model 502, two "high-resolution" primary ML models 504 and 506 (corresponding to the normal and anomaly classes), and four secondary ML models 508, 510, 512, and 514 (corresponding to the normal1, normal2, anomaly1, and anomaly2 types). Low-resolution primary model 502 is coupled with high-resolution primary ML models 504 and 506 via a data forwarder 516. In addition, high-resolution primary ML models 504 and 506 are coupled to secondary ML models 508, 510 and 512, 514 via data forwarders 518 and 520 respectively.

In operation, when a query data instance h from data set H is received, REC model 500 can use low-resolution primary ML model 502 to classify h as belonging to one of the classes "normal" or "anomaly." Data forwarder 516 can then forward h to an appropriate high-resolution primary ML model 504/506 (in accordance with the classification determined by the low-resolution model), and that high-resolution primary ML model can further classify h as belonging to one of the types that are part of that class (i.e., either normal1/normal2 or anomaly1/anomaly2). Finally, if the classification result generated by the high-resolution primary ML model has a confidence level that falls below a classification confidence threshold, data instance h can be forwarded again to an appropriate secondary ML model 508-514 for additional classification in a manner similar to the classification workflow described for REC model 200 of FIG. 2.

With this hierarchical architecture and approach, a given query data instance can be quickly identified as being either normal or anomalous via low-resolution primary ML model 502, which can be useful for taking an immediate action based on its normal or anomaly status. The query data instance can then be further classified as belonging to one of the types that fall under the normal and anomaly classes via high-resolution primary ML models 504/506 and/or secondary ML models 508-514, in a manner that achieves all of the benefits described previously with respect to REC model 200 (e.g., reduced memory footprint and training time, low classification latency, etc.).

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising:
    receiving, by a computer system, a query data instance to be classified as belonging to one of a plurality of classes;
    generating, by the computer system, a first classification result for the query data instance using a first machine learning (ML) model, the first classification result including a predicted class from among the plurality of classes for the query data instance and a confidence level indicating a likelihood that the predicted class is correct;
    comparing, by the computer system, the confidence level with a classification confidence threshold;
    if the confidence level is greater than or equal to the classification confidence threshold, outputting, by the computer system, the first classification result as a final classification result for the query data instance; and
    if the confidence level is less than the classification confidence threshold, forwarding, by the computer system, the query data instance to one of a plurality of second ML models.

2. The method of claim 1 wherein each of the plurality of second ML models is associated with a class in the plurality of classes, and wherein the query data instance is forwarded to a second ML model associated with the predicted class.

3. The method of claim 1 wherein the plurality of second ML models are trained to classify data instances which the first ML model cannot classify with confidence levels meeting or exceeding the classification confidence threshold.

4. The method of claim 1 further comprising:
    generating a second classification result for the query data instance using the second ML model to which the query data instance has been forwarded; and
    outputting the second classification result as the final classification result for the query data instance.

5. The method of claim 1 wherein each of the plurality of second ML models is based on an ML classifier that is larger in memory size than the first ML model.

6. The method of claim 1 further comprising:
    receiving a training data set comprising a plurality of training data instances;
    training the first ML model using the plurality of training data instances; and
    subsequently to training the first ML model, for each training data instance in the plurality of training data instances:
        generating a classification result for the training data instance using the first machine learning (ML) model, the classification result including a predicted class for the training data instance and another confidence level indicating a likelihood that the predicted class for the training data instance is correct;
        comparing said another confidence level with a training confidence threshold; and if said another confidence level is less than the training confidence threshold:
  forwarding the training data instance to another one of the plurality of second ML models; and
  training said another second ML model using the training data instance.

7. The method of claim 6 wherein the training confidence threshold is greater than or equal to the classification confidence threshold.

8. A non-transitory computer readable storage medium having stored thereon program code executable by a computer system implementing a method comprising:
  receiving a query data instance to be classified as belonging to one of a plurality of classes;
  generating a first classification result for the query data instance using a first machine learning (ML) model, the first classification result including a predicted class from among the plurality of classes for the query data instance and a confidence level indicating a likelihood that the predicted class is correct;
  comparing the confidence level with a classification confidence threshold;
  if the confidence level is greater than or equal to the classification confidence threshold, outputting the first classification result as a final classification result for the query data instance; and
  if the confidence level is less than the classification confidence threshold, forwarding the query data instance to one of a plurality of second ML models.

9. The non-transitory computer readable storage medium of claim 8 wherein each of the plurality of second ML models is associated with a class in the plurality of classes, and wherein the query data instance is forwarded to a second ML model associated with the predicted class.

10. The non-transitory computer readable storage medium of claim 8 wherein the plurality of second ML models are trained to classify data instances which the first ML model cannot classify with confidence levels meeting or exceeding the classification confidence threshold.

11. The non-transitory computer readable storage medium of claim 8 wherein the method further comprises:
  generating a second classification result for the query data instance using the second ML model to which the query data instance has been forwarded; and
  outputting the second classification result as the final classification result for the query data instance.

12. The non-transitory computer readable storage medium of claim 8 wherein each of the plurality of second ML models is based on an ML classifier that is larger in memory size than the first ML model.

13. The non-transitory computer readable storage medium of claim 8 wherein the method further comprises:
  receiving a training data set comprising a plurality of training data instances;
  training the first ML model using the plurality of training data instances; and
  subsequently to training the first ML model, for each training data instance in the plurality of training data instances:
    generating a classification result for the training data instance using the first machine learning (ML) model, the classification result including a predicted class for the training data instance and another confidence level indicating a likelihood that the predicted class for the training data instance is correct;
    comparing said another confidence level with a training confidence threshold; and
    if said another confidence level is less than the training confidence threshold:
      forwarding the training data instance to another one of the plurality of second ML models; and
      training said another second ML model using the training data instance.

14. The non-transitory computer readable storage medium of claim 13 wherein the training confidence threshold is greater than or equal to the classification confidence threshold.

15. A computer system comprising:
  a processor; and
  a non-transitory computer readable medium having stored thereon program code that, when executed, causes the processor to:
    receive a query data instance to be classified as belonging to one of a plurality of classes;
    generate a first classification result for the query data instance using a first machine learning (ML) model, the first classification result including a predicted class from among the plurality of classes for the query data instance and a confidence level indicating a likelihood that the predicted class is correct;
    compare the confidence level with a classification confidence threshold;
    if the confidence level is greater than or equal to the classification confidence threshold, output the first classification result as a final classification result for the query data instance; and
    if the confidence level is less than the classification confidence threshold, forward the query data instance to one of a plurality of second ML models.

16. The computer system of claim 15 wherein each of the plurality of second ML models is associated with a class in the plurality of classes, and wherein the query data instance is forwarded to a second ML model associated with the predicted class.

17. The computer system of claim 15 wherein the plurality of second ML models are trained to classify data instances which the first ML model cannot classify with confidence levels meeting or exceeding the classification confidence threshold.

18. The computer system of claim 15 wherein the program code further causes the processor to:
  generate a second classification result for the query data instance using the second ML model to which the query data instance has been forwarded; and
  output the second classification result as the final classification result for the query data instance.

19. The computer system of claim 15 wherein each of the plurality of second ML models is based on an ML classifier that is larger in memory size than the first ML model.

20. The computer system of claim 15 wherein the program code further causes the processor to:
  receive a training data set comprising a plurality of training data instances;
  train the first ML model using the plurality of training data instances; and
  subsequently to training the first ML model, for each training data instance in the plurality of training data instances:
    generate a classification result for the training data instance using the first machine learning (ML) model, the classification result including a predicted class for the training data instance and another confidence level indicating a likelihood that the predicted class for the training data instance is correct;

compare said another confidence level with a training confidence threshold; and if said another confidence level is less than the training confidence threshold:
  forward the training data instance to another one of the plurality of second ML models; and
  train said another second ML model using the training data instance.

21. The computer system of claim 20 wherein the training confidence threshold is greater than or equal to the classification confidence threshold.

* * * * *